July 29, 1969  P. E. THOMA  3,458,845
CROSSLINKED ELECTRICAL RESISTANCE HUMIDITY SENSING ELEMENT
Filed Nov. 8, 1967
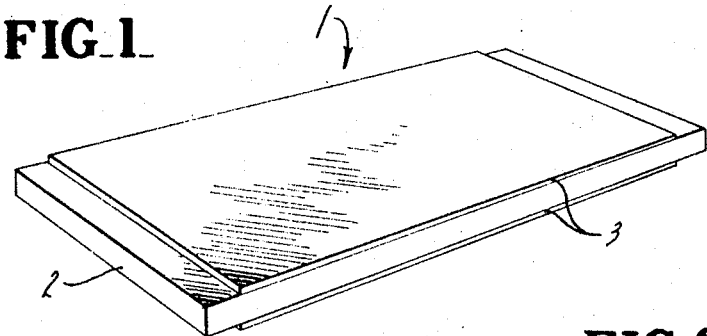
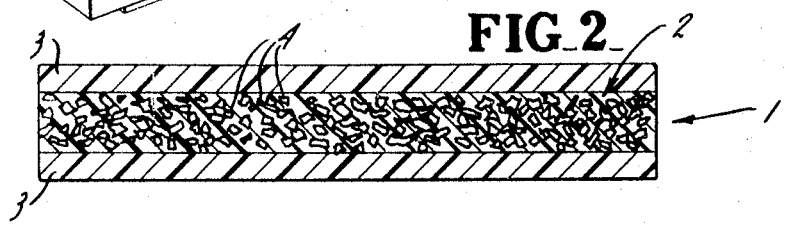
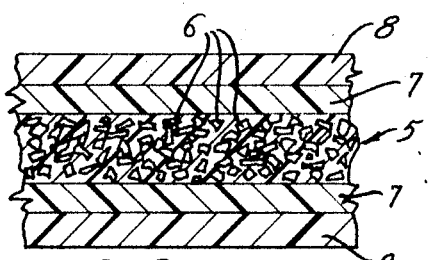
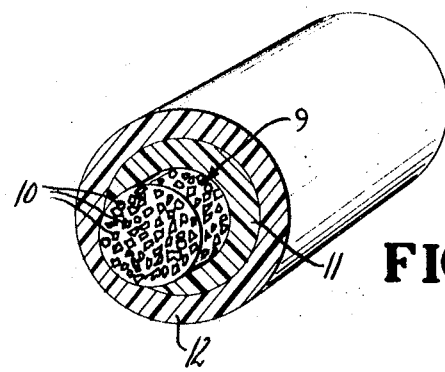
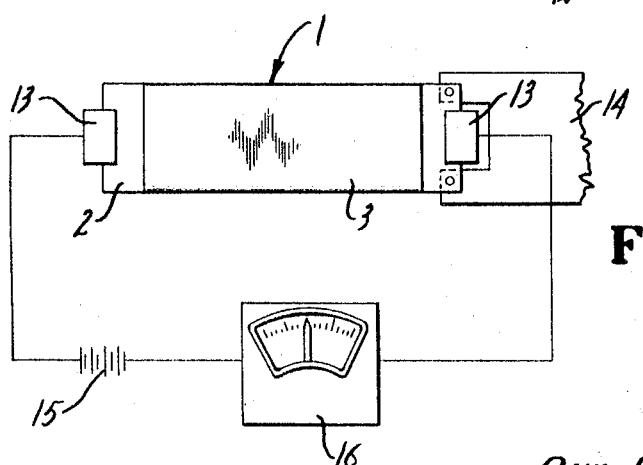
INVENTOR.
PAUL E. THOMA
BY
Andrus & Starke
Attorneys 3,458,845
CROSSLINKED ELECTRICAL RESISTANCE
HUMIDITY SENSING ELEMENT
Paul E. Thoma, Milwaukee, Wis., assignor to Johnson Service Company, Milwaukee, Wis., a corporation of Wisconsin
Filed Nov. 8, 1967, Ser. No. 681,362
Int. Cl. H01c *13/00*
U.S. Cl. 338—35                         14 Claims

ABSTRACT OF THE DISCLOSURE

The invention relates to a synthetic, electrical humidity sensing element including a core containing interconnected particles of an electrically conductive material and an outer moisture sensitive layer bonded to the core. Either the core or the outer layer, or both, are formed of organic crosslinked materials which provide improved chemical resistance, creep resistance and thermal stability for the element.

---

Patent 3,295,088 relates to an electrical humidity sensing element in which electrically conductive particles, such as carbon, are dispersed in the form of chains within the core, and an outer moisture sensitive layer is bonded to the core throughout its length. With the element shown in the aforementioned patent, an increase in the moisture content of the atmosphere causes an expansion of the moisture sensitive layer and puts the core under stress or tension which serves to elongate the chains of particles within the core to increase the electrical resistance of the element. On a decrease in humidity conditions, the moisture sensitive layer will contract and the elastic core acts a spring to return the moisture sensitive layer to its original dimension. The release of tension on the core serves to compress the particle chains in the core and thereby decreases the resistance to current flow through the core.

While the electrical humidity sensing element shown in Patent 3,295,088 has a number of distinct advantages over prior types, including reproducible humidity sensing properties, variable sensitivity to humidity by varying the composition, configuration and processing of the element, fast response to humidity changes, low hysteresis and good stability in normal environments, it has been found that the thermoplastic nature of this type of humidity sensing element limits the range of temperature in which it can effectively operate and limits the stress which can be applied to the element in service. Another limitation of this type of element is that it is not particularly resistant to attack from common organic solvents and detergents.

The present invention is an improvement over the electrical humidity sensing element described in Patent 3,295,088 and provides improved thermal stability, greater resistance to plastic deformation or creep and improved resistance to chemical attack, with no loss of the advantageous characteristics of the prior element. The element of the invention includes a core containing interconnected particles of an electrically conductive material, such as carbon, and an outer moisture sensitive layer is bonded to the core. Either the core or the outer layer, or both, are formed of organic crosslinked materials. Most specifically, the core and outer layer are either formed of a compound containing glucoside chains, such as a cellulosic material, or are formed of a reaction product of a compound containing glucoside chains and a monomer or partial polymer capable of reacting with the hydroxyl groups of the glucoside.

The fully or partially crosslinked core and/or outer layer provides greater resistance to creep, improved thermal stability and improved resistance to chemical attack for the humidity sensing element.

The electrical humidity sensing element of the invention has a rapid response to humidity conditions and is not affected by extremes of humidity or temperature. The element has low hysteresis and is substantially more stable than humidity sensing elements used in the past.

As the element is a synthetic product, it can be fabricated under controlled conditions and therefore requires less calibration from element-to-element.

As the electrically conductive material is embedded within the core, which in turn is covered or surrounded with the outer moisture sensitive layer, the problem of contamination of the electrically conductive material is minimized, thereby insuring more accurate and reliable readings.

Other objects and advantages will appear in the course of the following description.

The drawings illustrate the best mode presently contemplated of carrying out the invention.

In the drawings:

FIG. 1 is a perspective view of the electrical humidity sensing element of the invention;

FIG. 2 is a transverse section of the element;

FIG. 3 is a fragmentary section of a modified form of the element having a hydrolyzed outer moisture sensitive layer;

FIG. 4 is a perspective view of a second modified form of the element having an annular hydrolyzed moisture-sensitive outer layer; and FIG. 5 is a schematic representation showing the element in an electrical humidity indicating system.

FIGS. 1 and 2 illustrate an electrical humidity sensing element 1 comprising an inner core 2 and outer layers 3 which are integrally bonded to the core. A plurality of uniformly distributed particles of an electrically conductive material 4 are uniformly dispersed within the core.

The particles 4 should be interconnected in electrical conductive relation within the core to provide a path for current flow. The particles 4 can be formed of any electrically conductive material such as carbon powder, aluminum dust, zinc dust, tungsten carbide powder or the like. The most effective type of carbon to be used is the chain-forming or electrically conductive type in which the particles gather into small chains to provide continuous conductive paths through the core.

The particles 4 generally comprise from about 5 to 50% by weight of the core. The particular weight relation of the particles 4 to the core 2 depends upon the type and quality of the particles, the effectiveness of the dispersion, the resistance desired in the element and the size and shape of the core material 2 and outer layers 3.

The size of the particles 4 is not particularly critical and generally the individual particles will have a particle size less than 10 microns and preferably smaller than one micron.

The core 2 is formed of a compound containing glucoside chains, such as a cellulosic material, or is formed of the reaction product of a compound containing glucoside chains and a stabilizing monomer capable of reacting with the hydroxyl groups of the glucoside. The glucoside-containing compound can be cellulose or a cellulose ester in which the esterifying acids contain up to 20 carbon atoms and preferably up to 6 carbon atoms. Specific examples are cellulose triacetate, cellulose butyrate, cellulose propionate, cellulose succinate, cellulose phthalate or the like. Cellulose nitrate can also be used as well as mixed cellulose esters such as cellulose acetate-butyrate and cellulose acetate-propionate. Cellulose ethers in which the etherifying alcohol contains up to 8 carbon atoms, such as ethyl cellulose, methyl cellulose, hydroxypropylmethylcellulose, and hydroxybutylmethylcellulose can also be employed.

If the core 2 is to be formed of a crosslinked material, the reactant used to react with the glucoside-containing compound can take the form of monomers or partial polymers of urea-formaldehyde, phenol-formaldehyde, melamine-formaldehyde, triazine-formaldehyde, hexamethoxymethylmelamine, glyoxal, 2 - hydroxyadipaldehyde, and the like.

The amount of the stabilizing monomer to be used in conjunction with the glucoside derivative can vary depending on the nature of the monomer or partial polymer and the degree of crosslinking desired. In the case of a resin which will crosslink with itself such as urea-formaldehyde, the monomer or partial polymer can vary within wide limits. Any excess of the monomer, over and above that which will react and crosslink with the glucoside will crosslink with itself. With a stabilizing monomer or partial polymer that will not crosslink with itself, such as hexamethoxymethylmelamine, the monomer should be used in a stoichiometric amount with the glucoside derivative or cellulosic material if complete crosslinking is desired, or less than a stoichiometric amount, if only partial crosslinking is desired, for any excess will tend to act as a plasticizer for the core 2 and thereby increase the creep of the element.

To accelerate the crosslinking reaction, a catalyst is usually added to the reaction mixture. Any conventional catalyst for the particular monomers or partial polymers being employed can be used. For example, catalysts to be used with urea-formaldehyde, phenol-formaldehyde and melamineformaldehyde monomers include trifluoroacetic acid, methanesulfonic acid, monobutyl acid orthophosphate, n-butyl acid phosphate, p-toluenesulfonic acid, and the like.

In addition to the catalyst, it may also be desirable in many instances to employ a catalyst stabilizer which serves to tie up the catalyst until the crosslinking reaction is desired to occur. The catalyst stabilizers are conventional materials and include epoxide monomers and triethylamine, 2 - dimethylaminoethanol, 2 - diethylaminoethanol, and other volatile organic amines having boiling points below 250° C. The epoxide monomers can be used as both a catalyst stabilizer and as a reactant in the crosslinking reaction.

The outer layers 3 are formed of a compound containing glucoside chains, or are formed of the reaction product of a compound containing glucoside chains and a monomer or partial polymer capable of reacting with the hydroxyl groups of the glucoside chains. The glucoside-containing compound, as well as the stabilizing monomer can be the same as those previously described with respect to the core 2.

As discussed with respect to the core 2, a catalyst is usually added to the crosslinking mixture when forming a crosslinked outer layer 3, and in some instances it may be desirable to also add a catalyst stabilizer such as those previously described.

Either the core 2 or the outer layers 3, or both, should be partially or fully crosslinked. In the preferred form of the invention, the core 2 is substantially completely crosslinked, while the outer layers 3 are either uncrosslinked or partially crosslinked. However, in some cases where improved chemical resistance is desired, the outer layers 3 can be fully crosslinked and the core can either be fully crosslinked, partially crosslinked or uncrosslinked.

The outer layers 3, whether non-crosslinked or crosslinked should have a moisture sensitivity such that the outer layer will show a dimensional increase of at least 0.5% and preferably 1.5 to 7% with a change from 0 to 100% humidity. These sensitivity values are based on the outer layer dissociated from the core and need only be in one direction. In some cases the core 2 will be less moisture sensitive than the outer layers 3, while in other instances the core can have substantially the same moisture sensitivity as the outer layers or a greater moisture sensitivity than the outer layers.

The thickness of the core 2 is related to the thickness of the outer layers 3. If a relatively moisture insensitive core is used and the core is too thick with respect to the thickness of the outer layers, the outer layers cannot provide the necessary dimensional change under changes in atmospheric moisture to deform the core. For an element having normal response, the thickness of the core will generally be in the range of about 0.1 to 5 mils, while the thickness of the outer layers should be less than about 3 mils and generally between 10 to 400% of the thickness of the core 2. However, this relationship can vary depending on the moisture sensitivity and the modulus of elasticity of the outer layers 3 and core 2 and the response desired. The optimum thickness ratio of the outer surface layers 3 with respect to the core 2 is generally arrived at experimentally.

The core 2 and outer layers 3 should preferably be generally coextensive in length and width. However, in some instances either the core or the outer layers may project beyond the other member and the function of the element will not be altered. Electrical connections to the element must be made to the core 2.

While FIG. 1 illustrates the layers 3 being located on both surfaces of core 2, it is contemplated that a single layer 3 may be applied to only one surface of the core. In this case, the element would tend to bow or curve under changes in humidity conditions rather than moving linearly if the moisture sensitivity of the outer layer differs from that of the core.

The core and outer layers 3 are bonded together throughout their dimensions and various methods may be employed to provide the bond between the members. For example, the outer layers 3 can be applied by coating the core 2 with a solvent solution of the reactants and subsequently evaporating the solvents and heating the laminated structure to achieve the crosslinking reaction. Alternately, the outer layers 3 can be bonded to the fully polymerized or crosslinked core 2 by use of auxiliary adhesives.

The preferred method of preparing the humidity sensing element is to initially dissolve the components of one of the outer layers 3 in a solvent, such as acetone, ethyl acetate, ethylmethylketone, butyl alcohol, methylene chloride, nitroethane, cyclohexanone, ethylene dichloride, methylisobutylketone, isobutylacetate, hexane, toluene, diethyl ether, water, ethyl alcohol, xylene, isopropyl alcohol, or the like. It is preferred to dissolve the materials in the solvent or solvent mixture in a closed container with mixing or agitation. The solution is then cast onto a glass plate with an adjustable strike-off bar. After the solvent has evaporated to form the first outer layer 3, a solvent solution of the core material with the particles 4 dispersed therein is then cast over the dried first outer layer by use of the strike-off bar.

When the solvent solution of the core material is cast onto the first outer humidity sensitive layer, the solvents will partially dissolve the surface of the previously cast outer layer and when the solvent of the core solution is evaporated, an adherent bond is provided between the two layers.

Following the drying of the core 2, a solvent solution of the second outer layer is cast over the dried core. Again, the solvent will tend to dissolve the surface of the dried core, and when the solvent is evaporated, an adherent bond results between the core 2 and the second moisture sensitive layer 3.

After the three-layer film is dry, the core 2 and/or the moisture sensitive layers 3, are polymerized or crosslinked by heating the laminated film on the glass plate to a temperature in the range of 200° to 400° F. and preferably 250° to 375° F. for a period of time sufficient to crosslink the stabilizing monomer with the hydroxyl groups of the glucoside chains.

While the crosslinking or polymerization reaction can be made to occur at room temperature with most formulations, better results are obtained when the reaction is carried out at an elevated temperature.

The moisture sensitivity of the outer layer 3 can be greater than that of the core 2, or can be the same as that of the core, or can be less than that of the core depending on the materials used to form the core and outer layers. Regardless of the moisture sensitivity of the outer layers, the outer layers should be permeable to moisture so that the water vapor can penetrate throughout the entire thickness of the outer layers.

If the element is formed with relatively moisture sensitive outer layers 3 and a relatively moisture insensitive core, the outer surface layers 3 will absorb moisture on an increase in humidity and tend to swell or expand. This expansion puts the core 2 under tension, resulting in a stretching or cleavage of the chains of the electrically conductive particles and thereby causing an increase in the resistance to current flow through the element. On a decrease in moisture conditions, the outer layers will shrink, releasing the tension on the core and putting the core in compression so that the chains of particles will be compressed to thereby decrease the resistance to the element.

On the other hand, if the outer layers 3 and core 2 are both relatively moisture sensitive, both the core and outer layers will absorb moisture and expand on an increase in humidity. The expansion of the core results in a stretching of the chains of the electrically conductive particles and causes an increase in resistance to current flow through the element. On a decrease in humidity, the outer layers 3 and core 2 will shrink or contract, thereby compressing the chains of particles in the core and decreasing the resistance of the element.

The sensitivity of the humidity sensing element can be further increased by hydrolyzing the outer surface of the cellulosic outer layer to regenerated cellulose, as shown in FIG. 3. In this embodiment, the element includes a core 5 containing a plurality of electrically conductive particles 6 similar to particles 4 of the first embodiment. Layers 7 of a moisture sensitive hydrolyzable material are bonded to opposite surfaces of the core 5. The outer layers 7 can be formed of a cellulosic material, similar to that previously described, and can be subjected to the influence of either an alkaline or an acid medium to hydrolyze substantially all of the acid radicals in the surface layer to thereby obtain a regenerated cellulose film 8 which provides maximum moisture sensitivity. The hydrolyzation can be accomplished by dipping the element into an alkaline or acid bath and maintaining it in the bath for a period of time sufficient to hydrolyze the acid groups on the surface of the outer layers 7. Alkaline materials which can be employed for the hydrolyzation are aqueous or alcoholic solutions of alkali metal bases, such as sodium hydroxide, potassium hydroxide, or lithium hydroxide. Alternately, alcoholic solutions of strong organic bases, such as tetramethylguanidine, trimethylamine, or benzyltrimethyl ammonium hydroxide can be used for the hydrolyzing action.

Hot alkaline solutions are preferred to increase the reaction rate. The time of contact or immersion in the alkaline solution depends, of course, on the material used, the temperature and strength of the solution. For example, a two-hour hydrolysis period, using a 5% sodium hydroxide solution, was required to hydrolyze a mixed cellulose ester outer layer 7 to obtain the desired high sensitivity. By increasing the strength of the solution to 50%, an almost immediate hydrolyzation occurred. The most effective reaction conditions were found to be obtained by immersing the element in 230° F., 40% sodium hydroxide solution for 1 to 4 minutes, depending on the desired layer thickness of the hydrolyzed layer.

After the hydrolyzation, the element is preferably rinsed in water to remove and dilute the alkaline residue.

Solutions of mineral acids, such as hydrochloric acid and sulphuric acid, can also be used to hydrolyze the cellulosic outer layers 7. However, the use of alkaline material provides a faster hydrolyzation and is preferred.

FIG. 4 illustrates a second modified form of the invention in which the humidity sensing element is cylindrical in shape and comprises a central core 9 containing uniformly distributed particles 10 of an electrically conductive material. The core 9 is similar to core 2 of the first embodiment but is in the form of a strand or filament and the particles 10 are similar to particles 4. An annular layer 11 of material, similar to the material of outer layers 3, is disposed around the core 9 and the outer surface of the layer 11 can be chemically treated or hydrolyzed, as previously described, to provide a highly moisture sensitive outer surface 12. The ends of the core 9 project beyond the annular layers 11 and 12 so that electrical contact can be made directly with the electrically conducting core. The element shown in FIG. 4 operates in a manner similar to that shown in FIGS. 1–3.

FIG. 5 is a schematic representation of the use of the element 1 in a humidity system. As shown in FIG. 5, electrodes or clamps 13 are attached to the ends of the element 1, and the ends of the core 2 are free of the outer surface layer 3 so that the clamps 13 can be attached directly to the core. One of the clamps 13 is rigidly secured to a fixed insulating support 14. The electrodes 13 are connected electrically in series with a source of electrical power 15 and an electrical instrument 16 which provides a means for measuring the electric current in the circuit. The instrument 16 may be an ammeter, an ohmmeter, a potentiometer or any other conventional device properly arranged for measuring either resistance of the element or the amount of current which passes in the circuit. As previously described, changes in moisture conditions in the atmosphere will cause a rearrangement in the chains of electrically conductive particles 4 to change the resistance in the element 1 and provide a reading on the instrument 16.

Specific examples of formulations for the core 2 and outer layers 3 are as follows:

Example 1

Element having a crosslinked, electrically conductive core and crosslinked outer layers and having the same humidity sensitive material in the core and outer layers.

(A) Solution formulation for the electrically conductive core:

| | Grams |
|---|---|
| Hydroxypropylmethylcellulose | 8.00 |
| Hexamethoxymethylmelamine | 1.20 |
| Conductive carbon | 3.30 |
| p-Toluenesulfonic acid | 0.04 |
| n-Butyl alcohol | 0.04 |
| Deionized water | 42.22 |
| Ethyl alcohol | 45.20 |

(B) Solution formulation for outer layers:

| | Grams |
|---|---|
| Hydroxypropylmethylcellulose | 10.00 |
| Hexamethoxymethylmelamine | 1.50 |
| p-Toluenesulfonic acid | 0.05 |
| n-Butyl alcohol | 0.05 |
| Deionized water | 68.40 |
| Ethyl alcohol | 20.00 |

Example 2

Element having a crosslinked, electrically conductive core and both outer layers uncrosslinked, and having dissimilar humidity sensitive materials in the core and outer layers.

(A) Solution formulation for the electrically conductive core:

| | Grams |
|---|---|
| Cellulose acetate butyrate (26% combined butyryl) | 5.20 |
| Urea-formaldehyde monomer | 5.60 |
| Conductive carbon | 2.30 |
| p-Toluenesulfonic acid | 0.15 |
| Epoxide monomer | 1.60 |
| Ethyl alcohol | 1.85 |
| n-Butyl alcohol | 2.00 |
| Ethyl acetate | 41.00 |
| Diacetone alcohol | 40.30 |

(B) Solution formulation for outer layers:

| | Grams |
|---|---|
| Cellulose acetate butyrate (17% combined butyryl) | 10.00 |
| Ethyl acetate | 90.00 |

Example 3

Element having a crosslinked, electrically conductive core and both outer layers uncrosslinked, and having the same humidity sensitive material in the core and outer layers.

(A) Solution formulation for the electrically conductive core:

| | Grams |
|---|---|
| Cellulose acetate butyrate (37% combined butyryl) | 5.20 |
| Urea-formaldehyde monomer | 5.60 |
| Conductive carbon | 2.30 |
| p-Toluenesulfonic acid | 0.15 |
| Triethylamine | 1.60 |
| Ethyl alcohol | 1.85 |
| n-Butyl alcohol | 2.00 |
| Methylene chloride | 48.80 |
| Diacetone alcohol | 32.50 |

(B) Solution formulation for outer layers:

| | Grams |
|---|---|
| Cellulose acetate butyrate (37% combined butyryl) | 10.00 |
| Methyl chloride | 90.00 |

Example 4

Element having an uncrosslinked, electrically conductive core and both outer layers crosslinked, and having the same humidity sensitive material in the core and outer layers.

(A) Solution formulation for the electrically conductive core:

| | Grams |
|---|---|
| Cellulose acetate (39.4% acetyl) | 5.20 |
| Conductive carbon | 2.30 |
| Methyl ethyl ketone | 37.00 |
| Methylene chloride | 55.50 |

(B) Solution formulation for outer layers:

| | Grams |
|---|---|
| Cellulose acetate (39.4% acetyl) | 6.20 |
| Hexamethoxymethylmelamine | 1.80 |
| 2-dimethylaminoethanol | 1.60 |
| p-Toluenesulfonic acid | 0.05 |
| n-Butyl alcohol | 0.05 |
| Diacetone alcohol | 10.00 |
| Methyl ethyl ketone | 45.30 |
| Methylene chloride | 35.00 |

A specific example of preparing the humidity sensing element of the invention using the formulation of Example 2 is as follows:

The outer layer solution was cast on a glass plate and the solvent was allowed to evaporate. The electrically conductive core solution was then cast over the outer layer on the glass plate and the solvents were allowed to evaporate. That area on the conductive core needed for making electrical contact was masked wtih tape. The outer layer solution was again cast on the glass plate over the electrically conductive core, and the solvent was allowed to evaporate. When the three layer film was dry, the masking tape was removed from the film to expose the electrically conductive core. With the film on the glass plate, the film core was crosslinked by heating to 350° F. for 15 minutes. After crosslinking, the film was cut into the desired outline for the humidity sensing element. The strips were then removed from the glass plate by running cold tap water over the glass plate.

Although the three layer film was sensitive to changes in relative humidity at this stage, its sensitivity to moisture was further increased by hydrolyzing the outer layers. The film was hydrolyzed by immersing the strip in an aqueous solution containing 40% sodium hydroxide for one minute at 230° F. After removal from this solution, the strip was rinsed in tap water for several hours and then dried.

Due to the crosslinked structure of the core and/or outer layers 3, the element is more resistant to chemical attack than conventional elements and can be washed or cleaned with solvents or detergent solutions without destroying the performance of the element. In addition, the crosslinked structure provides increased stability for the element at elevated temperatures and improves the resistance of the element to plastic deformation or creep when subjected to stress in service.

Various modes of carrying out the invention are contemplated as being within the scope of the following claims, particularly pointing out and distinctly claiming the subject matter which is regarded as the invention.

I claim:

1. An electrical device, comprising a first section characterized by the ability to respond in the form of dimensional changes to relative humidity, a second section substantially coextensive and bonded to a substantial surface portion of said first section, and a plurality of interconnected electrically conductive particles embedded and dispersed within the second section and disposed in sufficient contact to effect a measurement of variable resistance, one of said sections being formed of a material selected from the group consisting of (a) a non-crosslinked compound containing glucoside chains, and (b) a crosslinked reaction product of a compound containing glucoside chains and a stabilizing monomer or partial polymer capable of crosslinking with the hydroxyl groups of said glucoside chains, and the other of said sections being formed of (b), said crosslinked reaction product serving to increase the thermal stability, creep resistance and chemical resistance of the device.

2. The device of claim 1, wherein said compound is a cellulosic material.

3. The device of claim 1, in which said compound is a cellulose ester in which the esterifying acid contains up to 20 carbon atoms.

4. The device of claim 1, in which said monomer or partial polymer is selected from the group consisting of urea - formaldehyde, phenol - formaldehyde, melamine-formaldehyde, triazine-formaldehyde, hexamethoxymethylmelamine, glyoxal, and 2-hydroxyadipaldehyde.

5. The device of claim 1, wherein said compound is a cellulose derivative, and said device includes a third section bonded to the outer surface of said first section on the opposite side of said second section, said third section being produced by hydrolyzation of said cellulose derivative and consisting essentially of cellulose.

6. The device of claim 1, wherein said electrically conductive particles are carbon.

7. An electrical humidity sensing element, comprising a core formed of the reaction product of a compound containing glucoside chains and a stabilizing monomer or partial polymer capable of crosslinking with the hydroxyl groups of said glucoside chains, an outer layer bonded to a surface of said core, said outer layer being selected from the group consisting of (a) a non-crosslinked compound containing glucoside chains, and (b) a partially crosslinked reaction product of a compound containing glucoside chains and a stabilizing monomer or partial polymer capable of crosslinking with the hydroxyl groups of said glucoside chains, and a series of interconnected electrically conductive particles embedded and dispersed within a substantial portion of said core and disposed in sufficient contact to effect a measurement of variable resistance.

8. The element of claim 7, wherein said outer layer is bonded to opposite surfaces of said core.

9. The element of claim 7, wherein the outer surface of said outer layer is hydrolyzed and consists essentially of cellulose.

10. The device of claim 1, and including means attached to spaced portions on said second section for connecting said second section in an electrical circuit.

11. The device of claim 10, and including means for securing one end of said second section to a fixed support.

12. The device of claim 1, wherein said second section comprises a core and said first section comprises an outer layer bonded to the core, said outer layer having a thickness less than 3 mils and being from 10% to 400% of the thickness of the core.

13. A method of fabricating a synthetic laminated electrical humidity sensing element, comprising the steps of embedding a plurality of electrically conductive particles in electrical conductive relation within a substantial portion of the length of a reaction mixture of a compound containing glucoside chains and a stabilizing monomer or partial polymer capable of crosslinking with the hydroxyl groups of said glucoside chains, forming a coating of a material having a relatively high sensitivity to moisture and characterized by the ability to respond in the form of dimensional changes to changes in relative humidity on a substantial surface portion of said reaction mixture, and reacting said compound and said monomer or partial polymer to provide a crosslinked material.

14. The method of claim 13, wherein said step of reacting is carried out by heating the reaction mixture to a temperature of 200° to 400° F.

References Cited

UNITED STATES PATENTS

| | | |
|---|---|---|
| 2,722,586 | 11/1955 | Stearns et al. |
| 2,728,831 | 12/1955 | Pope. |
| 2,937,524 | 5/1960 | Gregor. |
| 3,093,502 | 6/1963 | Drelich. |
| 3,295,088 | 12/1966 | Smith. |
| 3,301,057 | 1/1967 | Smith et al. |

REUBEN EPSTEIN, Primary Examiner

U.S. Cl. X.R.

73—336.5; 117—166; 252—510